United States Patent
Fujiki et al.

(10) Patent No.: US 7,222,667 B2
(45) Date of Patent: May 29, 2007

(54) VEHICULAR AIR-CONDITIONING APPARATUS

(75) Inventors: Tsutomu Fujiki, Wako (JP); Hitoshi Hakamada, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/259,699

(22) Filed: Oct. 26, 2005

(65) Prior Publication Data

US 2006/0102335 A1    May 18, 2006

(30) Foreign Application Priority Data

Oct. 28, 2004    (JP)    ............... 2004-314508

(51) Int. Cl.
*B60H 1/00*    (2006.01)
*B60H 3/00*    (2006.01)
*F25B 29/00*    (2006.01)

(52) U.S. Cl. .................. 165/202; 165/297; 165/42; 165/43; 165/204; 237/12.3 A; 237/12.3 B; 237/12.3 R; 219/202; 454/159; 454/160; 454/161

(58) Field of Classification Search ............... 165/297, 165/41, 42, 43, 202, 204; 237/12.3 R, 12.3 B, 237/12.3 A; 219/202; 454/159, 160, 161
See application file for complete search history.

(56) References Cited

U.S. PATENT DOCUMENTS

| | | | | |
|---|---|---|---|---|
| 4,459,466 A | * | 7/1984 | Nakagawa et al. | ......... 219/202 |
| 5,280,852 A | * | 1/1994 | Dauvergne | ............ 237/12.3 A |
| 5,299,631 A | * | 4/1994 | Dauvergne | ................. 165/204 |
| 5,755,380 A | * | 5/1998 | Virey | .................... 237/12.3 R |
| 2001/0018832 A1 | * | 9/2001 | Matsunaga et al. | ........... 62/239 |

FOREIGN PATENT DOCUMENTS

| DE | 19732523 C1 | * | 7/1998 |
|---|---|---|---|
| JP | 55068413 A | * | 5/1980 |
| JP | HEI 3-64108 | | 6/1991 |
| JP | 07186697 A | * | 7/1995 |

* cited by examiner

*Primary Examiner*—John K. Ford
(74) *Attorney, Agent, or Firm*—Rankin, Hill, Porter & Clark LLP

(57) ABSTRACT

A vehicular air-conditioning apparatus includes a hot-water heater and an electric heater provided downstream of the hot-water heater. The apparatus also includes a bypass passage for allowing air-conditioning air flowing past the hot-water heater to bypass the electric heater and a bypass door provided in the bypass passage for opening and closing the bypass passage.

1 Claim, 3 Drawing Sheets

VEHICULAR AIR-CONDITIONING APPARATUS

FIELD OF THE INVENTION

The present invention relates generally to a vehicular air-conditioning apparatus and, in particular, to a vehicular air-conditioning apparatus including an electric heater disposed downstream of a hot-water heater thereof.

BACKGROUND OF THE INVENTION

An example air-conditioning apparatus of this type is disclosed in JP-U-3-64108A, for example. The disclosed air-conditioning apparatus includes an air intake box having a door capable of pivotal movement to allow selective entry of inside or outside air, a duct in air communication with the box, a blower disposed between the box and the duct, a hot-water heater housed in the duct and designed to use engine-cooling water as a heat source, and a manual switch designed to be manually operated by a passenger in a passenger compartment to adjust a temperature of the compartment.

At a downstream end of the duct, there are formed discharge ports for discharging air from the duct while an electric heater is disposed adjacent to and downstream of the hot-water heater. The electric heater is located upstream of the downstream end of the duct and is supplied with electrical power from a source of electrical power. Disposed downstream of the electric heater is a temperature sensor for detecting a temperature of air passing through the electric heater.

The air-conditioning apparatus further includes a control unit for controlling the source of electrical power to supply electrical power to the electric heater when the following three conditions are satisfied: (1) a temperature of the air detected by the temperature sensor is lower than a temperature of the air obtained as the cooling water rises in temperature; (2) the fan is driven; and (3) the manual switch is adjusted to provide a maximum temperature of the passenger compartment.

In order that the air-conditioning apparatus provides an improved heating performance immediately after the engine is started, the electric heater keeps operating until the temperature of the cooling water reaches a predetermined temperature after the engine is started.

For the air-conditioning apparatus, however, defogging operation is less efficiently performed on a fogged window because a large amount of heated air to remove fog from the window can not be supplied to the window due to the presence of the electric heater acting as a resistance to a flow of the heated air flowing past the hot-water heater. Thus, the air-conditioning apparatus needs to be improved to provide a sufficient defogging performance as well as a heating performance.

SUMMARY OF THE INVENTION

According to an aspect of the present invention, there is provided a vehicular air-conditioning apparatus comprising: an air-conditioning duct for allowing passage of air-conditioning air therethrough; a hot-water heater, disposed within the air-conditioning duct, for heating the air-conditioning air by using engine-cooling water; an electric heater, disposed downstream of the hot-water heater, for electrically heating the air-conditioning air; a bypass passage for allowing the air-conditioning air flown past the hot-water heater to bypasses the electric heater; and a bypass door for selectively opening and closing the bypass passage.

The air-conditioning apparatus performs not only a conventional heating operation when the bypass door is closed but also an improved defogging operation by supplying a window of the vehicle with a large amount of the air-conditioning air having bypassed the electric heater when the bypass door is opened.

Preferably, the air-conditioning apparatus further comprises control means for controlling the bypass door such that the bypass door is closed in a case where a mode of discharge of the air-conditioning air from the air-conditioning duct is in either a heater mode or a heater-defroster mode while a target temperature of the air-conditioning air discharged from the air-conditioning duct is equal to or higher than a predetermined temperature or a temperature of the engine-cooling water is equal to or lower than a predetermined temperature and the bypass door is opened in other cases.

By virtue of the control unit, the bypass door is automatically controlled to be closed to achieve the heating operation and to be opened to achieve the defogging operation.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENTS

Figure 1:
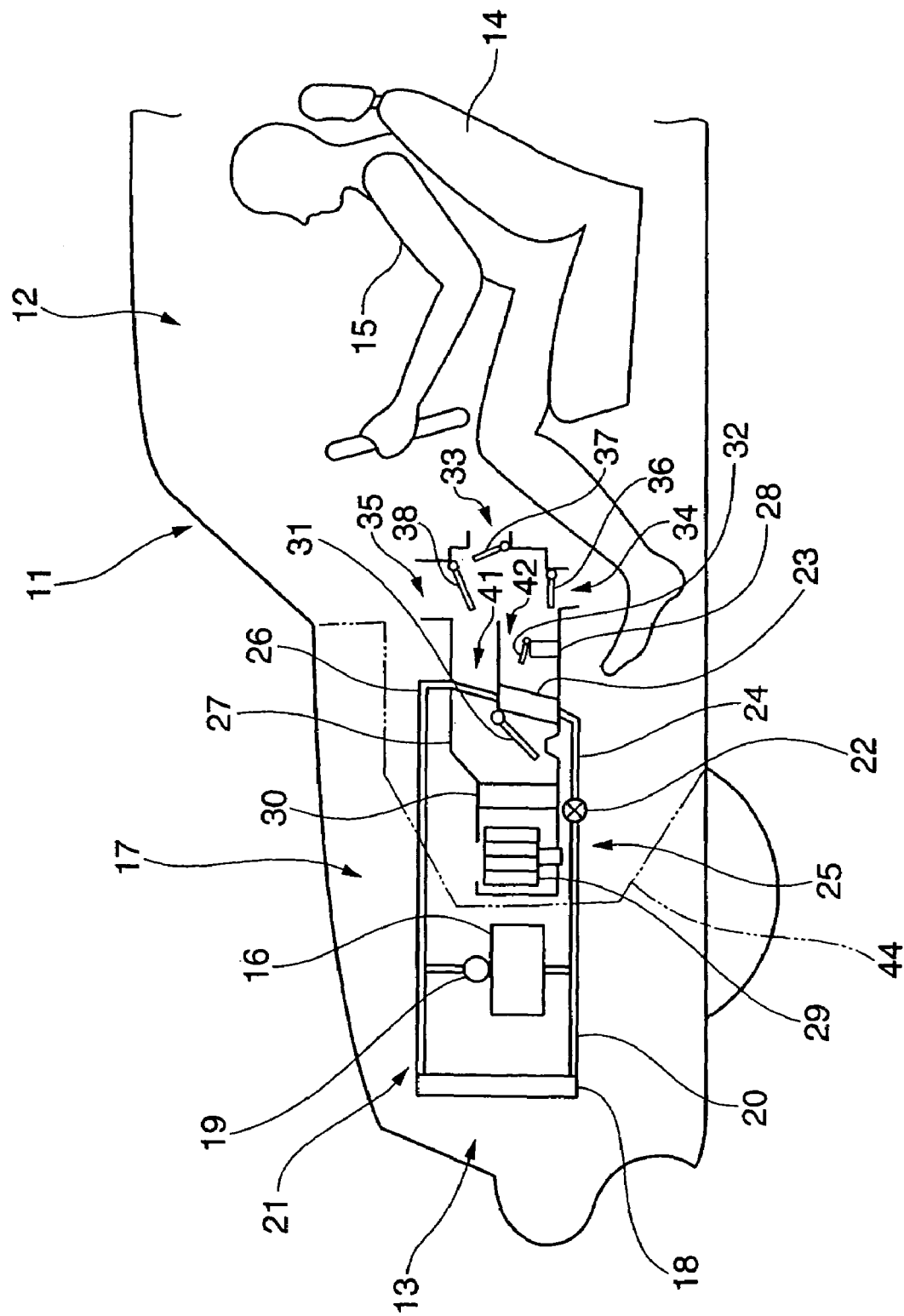
FIG. 1 is a schematic view showing part of a vehicle including an air-conditioning apparatus according to the present invention.

Initial reference is made to FIG. 1 showing a vehicle 11 having a passenger compartment 12 and an engine compartment 13. A driver 15 sits on a seat 14. An engine 16 is disposed within the engine compartment 13. The engine 16 outputs a motive power to be transmitted through a transmission mechanism (not shown) to wheels.

A radiator 18 is disposed forwardly of the engine 16. The radiator 18 is connected through a pipe 20 to a water pump 19 and the engine 16. The engine 16, the water pump 19 and the pipe 20 constitute a cooling circuit 21. The engine 16 is connected to a hot-water heater 23 through a pipe 24. The pipe 24 is equipped with a water valve 22. The hot-water heater 23 is connected to the water pump 19 through a pipe 26. The engine 16, the water pump 19, the water valve 22, the hot-water heater 23 and the pipes 24, 26 constitute a heater circuit 25.

The water pump 19 is driven by the engine 16. The water pump 19 acts to pump cooling water through water jackets of the engine 16 into the radiator 18. The cooling water is heated to a high temperature as the cooling water flows through the water jackets of the engine 16.

The heated cooling water from the engine 16 is cooled by the radiator 18. The cooling water thus cooled by the radiator 18 is returned to the water pump 19. The cooling water circulates through the heater circuit 25. The hot-water heater 23 is a heat exchanger. An air-conditioning duct 27 is equipped with the hot-water heater 23 using the cooling water from the engine 16 for heating air passing through the hot-water heater 23. The duct 27 is also equipped with an electric heater 28 such as a PTC heater or a heater including a heating wire. The electric heater 28 is disposed downstream of the hot-water heater 23 for electrically heating the air.

The cooling water heated in the water jackets of the engine 16 flows through the hot-water heater 23. The water valve 22 is disposed on an entrance side of the hot-water-heater 23 for allowing a required amount of the cooling water to flow into the hot-water heater 23 where necessary.

Figure 2:
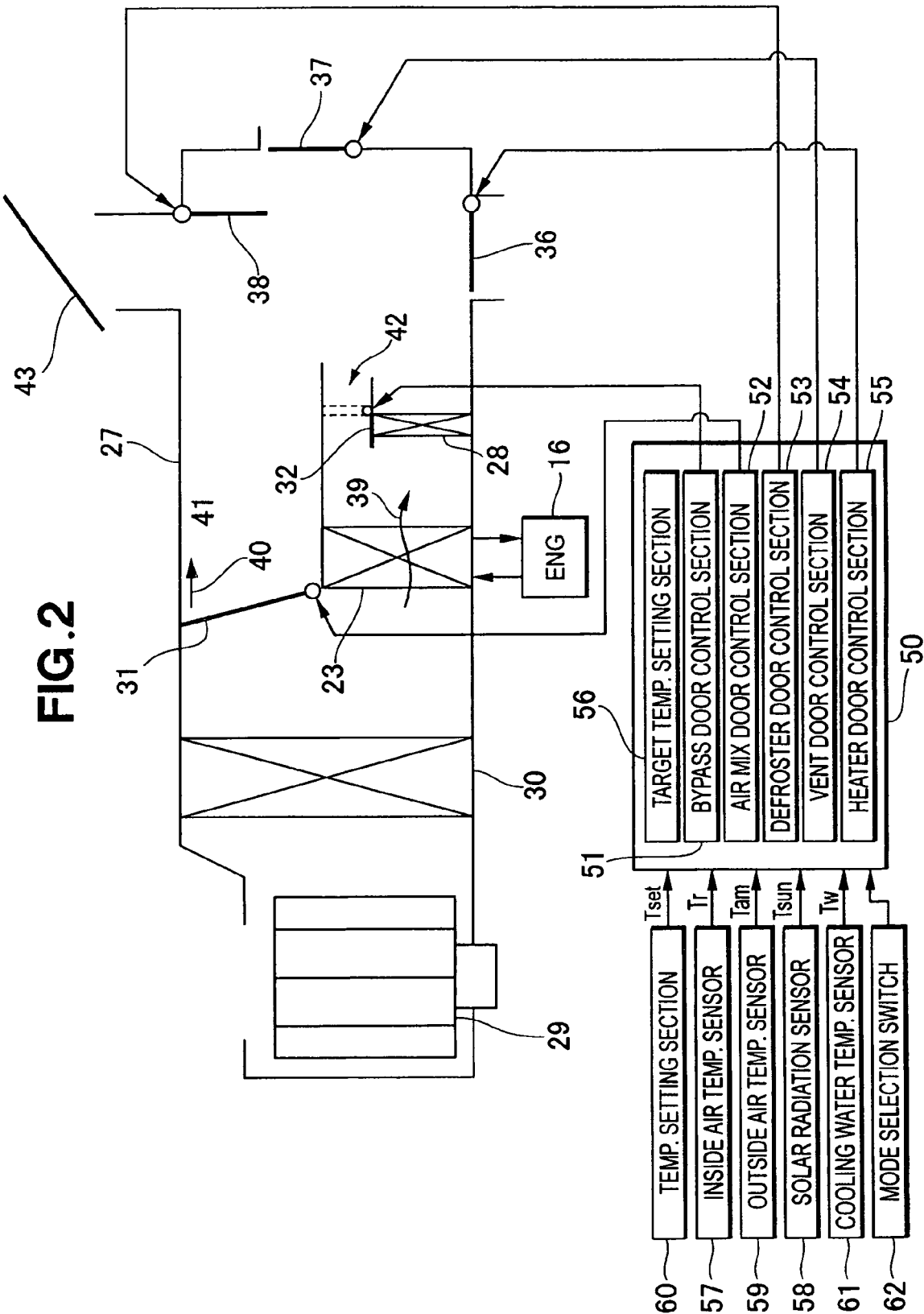
FIG. 2 is a view showing an arrangement of the air-conditioning apparatus including a control unit.

The duct 27 is provided with a fan 29, an evaporator (heat exchanger) 30, an air mix door 31 movable between opened and closed positions, the hot-water heater 23, the electric heater 28 and a bypass door 32, and discharge ports 33, 34, 35 all of which are arranged in the named order from an upstream side on which the engine compartment 13 is formed. An air-conditioning air is directed by the fan 29 to the evaporator 30 and cooled by the evaporator 30. The port 33 is a vent directed to an upper half body of a vehicle occupant. The port 34 is directed to a lower half body, more specifically, to feet of the occupant. The port 35 is directed to an inner side of a windshield 43 (FIG. 2). The duct 27 is provided with a heater door 36 for selectively opening and closing the port 34. The duct 27 is provided with a vent door 37 for selectively opening and closing the port 33. The duct 27 is provided with a defroster door 38 for selectively opening and closing the port 35.

The air-conditioning air flows through the air-conditioning duct 27. The air-conditioning air includes a heated air 39 passing through the hot-water heater 23, and a non-heated air 40 bypassing the hot-water heater 23. The non-heated air 40 flows through a bypass passage portion 41 for bypassing the hot-water heater 23.

The bypass door 32 selectively opens and closes a bypass passage portion 42 bypassing the electric heater 28. The heated air 39 having passed through the hot-water heater 23 bypasses the electric heater 28 by flowing through the bypass passage portion 42.

The air-conditioning air having its temperature adjusted within the duct 27 is supplied from the duct 27 into the passenger compartment 12. The passenger compartment 12 is separated from the engine compartment 13 by a partition wall 44.

An air-conditioning apparatus 17 can supply the passenger compartment 12 with the air heated by passing through the hot-water heater 23. The air-conditioning apparatus 17 performs a conventional heating operation when the bypass door 32 is closed. The apparatus 17 performs an improved defogging operation by supplying the windshield 43 with a large amount of the air having bypassed the electric heater 28 when the bypass door 32 is opened.

FIG. 2 shows the air-conditioning apparatus 17 including a control unit 50.

The control unit 50 includes a bypass door control section 51 for controlling the bypass door 32 to open and close the bypass door 32, an air mix door control section 52 for controlling the air mix door 31 to open and close the air mix door 31, a defroster door control section 53 for controlling the defroster door 38 to open and close the defroster door 38, a vent door control section 54 for controlling the vent door 37 to open and close the vent door 37, a heater door control section 55 for controlling the heater door 36 to open and close the heater door 36, and a target temperature setting section 56 for sending the bypass door control section 51 an instruction signal. The control unit 50 is a computer carried on the vehicle 11.

Input to the control unit 50 are a signal Tr (regarding a temperature of air within the passenger compartment 12) from an inside air temperature sensor 57, a signal Tsun (regarding an amount of sunlight coming into the passenger compartment 12) from a solar radiation sensor 58, a signal Tam (regarding a temperature of air outside the passenger compartment 12) from an outside air temperature sensor 59, a signal Tset (regarding a set temperature of air within the passenger compartment 12) from a temperature setting section 60, and a signal Tw (regarding a temperature of the cooling water) from a cooling water temperature sensor 61.

The signal Tset indicates a temperature of the air set by the driver 15. The sensor 57 detects the temperature of the air within the passenger compartment 12 and outputs the signal Tr. The sensor 58 detects the amount of sunlight coming into the passenger compartment 12 and outputs the signal Tsun. The sensor 59 detects the temperature of the air outside the passenger compartment 12 and outputs the signal Tam. The sensor 61 detects the temperature of the cooling water and outputs the signal Tw.

Input to the control unit 50 are a signal from a mode selection switch 62 as well as the signals Tr, Tsun, Tam, Tset, Tw, The signal from the switch 62 indicates which mode is selected from a defroster mode, a heater-defroster mode, a vent mode, a bi-level mode and a heater mode.

When the defroster mode is selected by the switch 62, the defroster door 38 is opened. When the heater-defroster mode is selected by the switch 62, the heater door 36 and the defroster door 38 are opened. When the vent mode is selected by the switch 62, the vent door 37 is opened. When the bi-level mode is selected by the switch 62, the heater door 36 and the vent door 37 are opened. When the heater mode is selected by the switch 62, the heater door 36 is opened.

Figure 3:
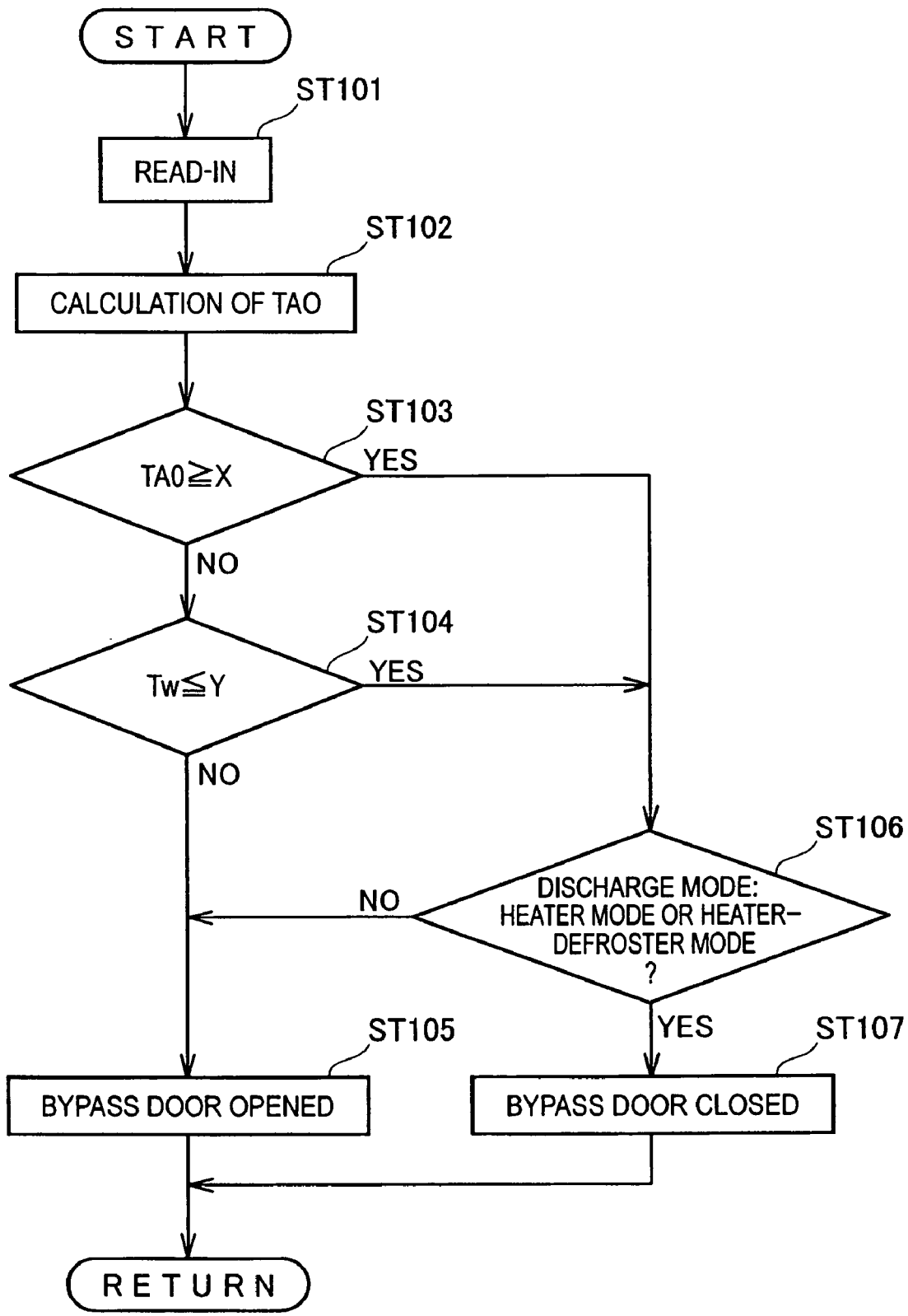
FIG. 3 is a flow chart for controlling a bypass door of the air-conditioning apparatus to open or close the bypass door.

The control unit 50 controls the bypass door 32 to open and close the bypass door 32 on the basis of the above various signals, as shown by a flow chart of FIG. 3.

Referring to FIG. 3, a first step (hereinafter referred to as "ST") 101 reads in the signals Tr, Tsun, Tam, Tset and Tw input to the control unit 50.

ST102 calculates a target temperature (TAO) of the air-conditioning air discharged from the air-conditioning duct 27, through the use of the following equation (1):

$$TAO = Kset \times Tset - Kr \times Tr - Kam \times Tam - Ksun \times Tsun + C \quad (1)$$

where Tset is the set temperature of the air within the passenger compartment 12, Tr is the temperature of the air within the passenger compartment 12, Tam is the temperature of the air outside the passenger compartment 12, Tsun is the amount of sunlight coming into the passenger compartment 12, and Kset, Kr, Kam, Ksun and C denote constants.

ST103 judges whether or not the TAO calculated in ST102 is equal to or higher than a predetermined temperature X (for example, 45 Celsius).

If the TAO is judged to be less than the predetermined temperature X in ST103, the control over the bypass door 32 is transferred to ST104. ST104 judges whether or not the temperature Tw of the cooling water of the engine 16 is equal to or lower than a predetermined temperature Y (for example, 55 Celsius). If the temperature Tw is judged to be more than the predetermined temperature Y in ST104, the control over the bypass door 32 is transferred to ST105. ST105 opens the bypass door 32 and the control over the bypass door 32 is returned to ST101.

The control over the bypass door 32 is transferred to ST106 if the TAO is judged to be equal to or higher than the predetermined temperature X in ST103. ST106 makes a judgment whether or not a mode of discharging the air-conditioning air from the air-conditioning duct 27 (hereinafter referred to as "discharge mode") is either the heater mode or the heater-defroster mode.

If the discharge mode is judged to be either the heater mode or the heater-defroster mode in ST106, the control over the bypass door 32 is transferred to ST107. ST107 closes the bypass door 32 and the control over the bypass door 32 is returned to ST101.

The control over the bypass door 32 is transferred to ST105 for opening the bypass door 32 if the discharge mode is judged to be neither the heater mode nor the heater-defroster mode in ST106.

If the temperature Tw is judged to be equal to or lower than the predetermined temperature Y in ST104, the control over the bypass door 32 is transferred to ST106 for judgment whether or not the discharge mode is either the heater mode or the heater-defroster mode.

Therefore, the control unit 50 controls the bypass door 32 to close the bypass door 32 for providing a conventional heating performance or to open the bypass door 32 for allowing the large amount of the air to bypass the electric heater 28 and then flow towards the windshield 43 for providing an improved defogging performance.

Obviously, various minor changes and modifications of the present invention are possible in the light of the above teaching. It is therefore to be understood that within the scope of the appended claims the invention may be practiced otherwise than as specifically described.

What is claimed is:

1. A vehicular air-conditioning apparatus comprising:
    an air-conditioning duct for allowing passage of air-conditioning air therethrough;
    a hot-water heater, disposed within the air-conditioning duct, for heating the air-conditioning air by using engine-cooling water;
    an electric heater, disposed downstream of the hot-water heater, for electrically heating the air-conditioning air;
    a bypass passage for allowing the air-conditioning air flowing past the hot-water heater to bypass the electric heater;
    a bypass door for selectively opening and closing the bypass passage; and,
    a controller for controlling the bypass door such that the bypass door is closed only when:
        a mode of discharge of the air-conditioning air from the air-conditioning duct is one of a heater mode and a heater-defroster mode; and,
        a target temperature of the air-conditioning air discharged from the air-conditioning duct is equal to or higher than a predetermined air temperature or a temperature of the engine-cooling water is equal to or lower than a predetermined water temperature.

* * * * *